(12) United States Patent
Maeda et al.

(10) Patent No.: US 6,212,136 B1
(45) Date of Patent: Apr. 3, 2001

(54) MAGNETO-OPTICAL DISC APPARATUS WITH MEANS TO CHANGE THE ANGLE AND DISTANCE BETWEEN A MAGNETIC FIELD GENERATING SOURCE AND A MAGNETO-OPTICAL DISC

(75) Inventors: Fumisada Maeda; Yoshinori Matsumoto, both of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 08/354,454

(22) Filed: Dec. 12, 1994

Related U.S. Application Data

(63) Continuation of application No. 08/050,658, filed on Apr. 22, 1993, now abandoned.

(30) Foreign Application Priority Data

Apr. 24, 1992 (JP) .............................................. P04-106929

(51) Int. Cl.[7] .................................................. G11B 11/105
(52) U.S. Cl. ............................................................ 369/13
(58) Field of Search ........................ 360/114, 59; 369/13

(56) References Cited

U.S. PATENT DOCUMENTS

| | | | |
|---|---|---|---|
| 4,748,606 | * 5/1988 | Naito et al. | 369/13 |
| 4,837,758 | 6/1989 | Motoyama et al. | 369/13 |
| 4,993,009 | * 2/1991 | Shiho | 360/114 |
| 5,179,544 | * 1/1993 | Hezemans et al. | 369/13 |
| 5,202,863 | * 4/1993 | Miyatake et al. | 360/114 |

OTHER PUBLICATIONS

*Patent Abstracts of Japan*, vol. 15, No. 492, Dec. 12, 1991, *Magnetic Field Application Device*, Akira et al.

*Patent Abstracts of Japan*, vol. 8, No. 208, Sep. 21, 1991, *Photo–Magnetic Recorder*, Akira et al.

* cited by examiner

*Primary Examiner*—William R. Korzuch
(74) *Attorney, Agent, or Firm*—Sonnenschein, Nath & Rosenthal

(57) ABSTRACT

The present invention is directed to a magneto-optical disc apparatus which includes a magnetic field generating source (12). The magnetic field generating source (12) is disposed so as to become freely rotatable with respect to a magneto-optical disc (1) and a spacing between it and the magneto-optical disc (1) can be changed. Plural kinds of magneto-optical discs can be recorded and reproduced with a compatibility by the common magnetic field generating source (12).

3 Claims, 5 Drawing Sheets

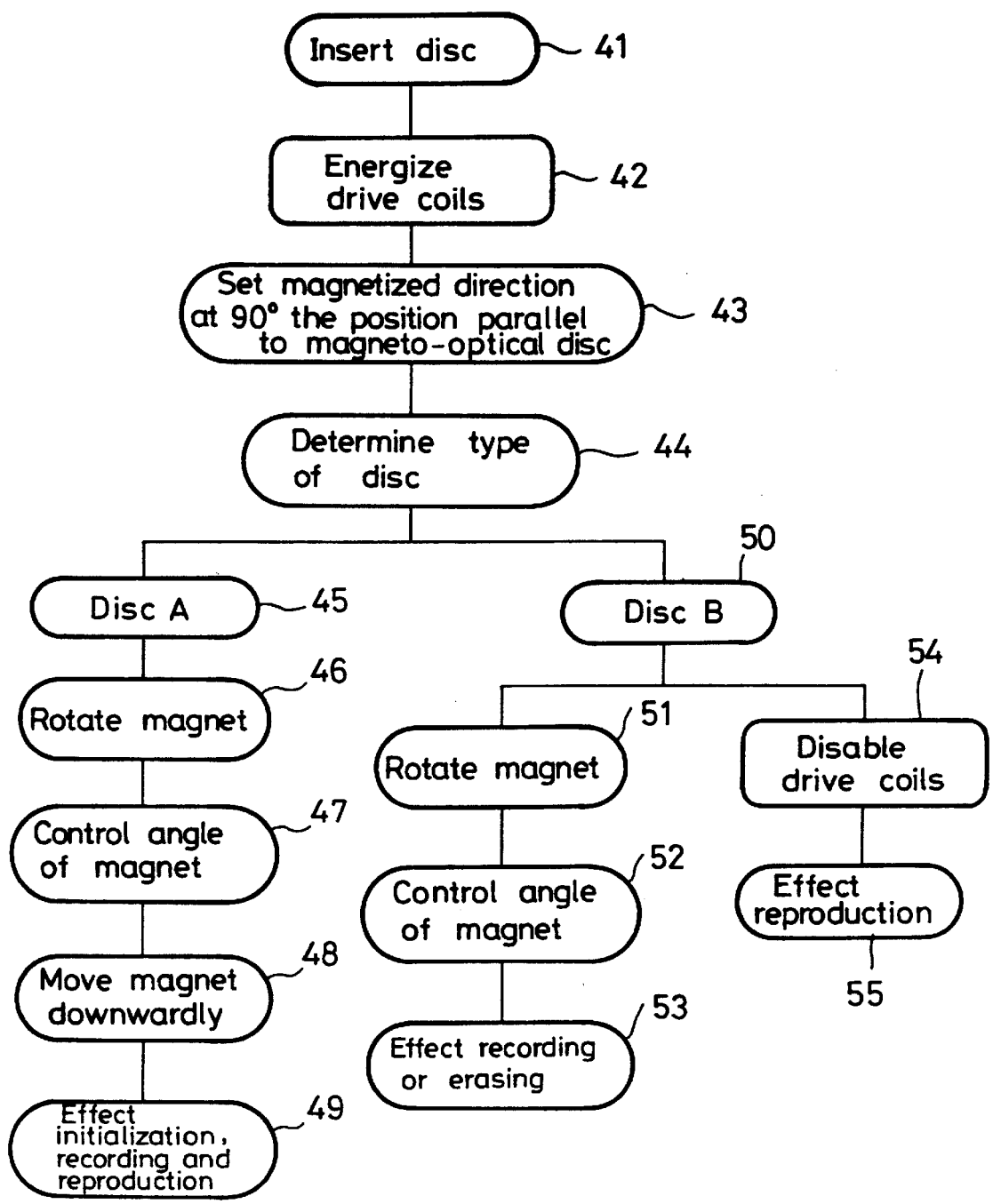

MAGNETO-OPTICAL DISC APPARATUS WITH MEANS TO CHANGE THE ANGLE AND DISTANCE BETWEEN A MAGNETIC FIELD GENERATING SOURCE AND A MAGNETO-OPTICAL DISC

This is a continuation of application Ser. No. 08/050,658 filed Apr. 22, 1993 now abandoned.

BACKGROUND OF THE INVENTION

1. Field of the Invention

The present invention relates to an apparatus for magneto-optical disc.

2. Description of the Prior Art

Research and development of various magneto-optical discs have achieved remarkable results these days and a wide variety of magneto-optical discs are now commercially available on the market. According to the ISO (international organization for standardization), a magnetic field applied to a magneto-optical disc by a magneto-optical disc apparatus is limited to 600 Oe (oersted). A magneto-optical recording apparatus capable of recording a writable magneto-optical disc disclosed in Japanese laid-open patent publication No. 62-175948 or a magneto-optical reproducing method capable of reproducing a magneto-optical disc of an ultra-high resolution disclosed in Japanese laid-open patent publication No. 3-88156 needs plural kinds of external magnetic fields. In this case, when a recording, e.g., overwrite is effected or a reproduction is effected, a strong external magnetic field different from a recording magnetic field or a reproducing magnetic field generated from a portion in which an optical pickup is disposed is applied to a magneto-optical disc in order to initialize a predetermined magnetic layer of, for example, a multi-layer magnetic film constructing a magnetic film.

FIG. 1 of the accompanying drawing shows a schematic plan view of a main portion of a conventional magneto-optical disc apparatus and FIG. 2 is a schematic side view thereof. As shown in FIGS. 1 and 2, when a magneto-optical recording apparatus is realized, a recording magnet 3 for generating a recording magnetic field is disposed on an optical axis of an optical pickup 2 that irradiates a magneto-optical disc 1 across the optical pickup 2 that records and reproduces the magneto-optical disc 1 in an opposing relation to the magneto-optical disc 1. An initialization magnet 4 is disposed at a different position in an opposing relation to the magneto-optical disc 1.

The initialization magnet 4 is used to generate a strong initialization magnetic field Hini of several kilooersteds as described above. Therefore, it is inappropriate that the magneto-optical disc, based on the restriction of the ISO (under which it is inhibited from being applied with a magnetic field of larger than 600 Oe) and the magneto-optical disc capable of overwrite or magneto-optical disc having special functions such as reproduction of ultra-high high solution or the like are applied to a common drive apparatus, i.e., common magneto-optical disc apparatus.

However, when the optical disc is recorded and reproduced, it is very disadvantageous for the user to properly use the magneto-optical disc based on the ISO and the special magneto-optical disc that needs the application of plural kinds of magnetic fields including a strong magnetic field on the common drive apparatus.

OBJECTS AND SUMMARY OF THE INVENTION

Therefore, it is an object of the present invention to provide an improved magneto-optical disc apparatus in which the aforesaid shortcomings and disadvantages encountered with the prior art can be eliminated.

More specifically, it is an object of the present invention to provide a magneto-optical disc apparatus which can record, reproduce and erase with a compatibility both a magneto-optical disc requiring plural kinds of different magnetic fields, such as a special magneto-optical disc, i.e., overwritable magneto-optical disc on which a recording can be effected by a light intensity modulation or a magneto-optical disc in which a reproduction with ultra-high resolution can be effected and a magneto-optical disc based on the ISO.

According to an aspect of the present invention, there is provided a magneto-optical disc apparatus which comprises a magnetic field generating source for applying a magnetic field to a magneto-optical disc, the magnetic field generating source being made freely rotatable about an axis substantially extended along a surface of the magneto-optical disc and a device for changing a distance of a rotation central axis of the magnetic field generating source relative to the magneto-optical disc.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 6 is a diagram showing operation of a magnetic field generating source, and to which references will be made in explaining operation of the magneto-optical disc apparatus according to the present invention.

DETAILED DESCRIPTION OF THE PREFERRED EMBODIMENT

The present invention will now be described with reference to the drawings.

According to the present invention, there is provided a magneto-optical disc apparatus which can record and reproduce with a compatibility both the above special magneto-optical disc, i.e., a magneto-optical disc (hereinafter referred to as a disc A) that needs plural kinds of different magnetic fields, such as an overwritable magneto-optical disc on which a recording is effected by a light intensity modulation, a magneto-optical disc in which an ultra-high resolution playback is effected or the like and a magneto-optical disc (hereinafter referred to as a disc B) based on the ISO.

Figure 1:
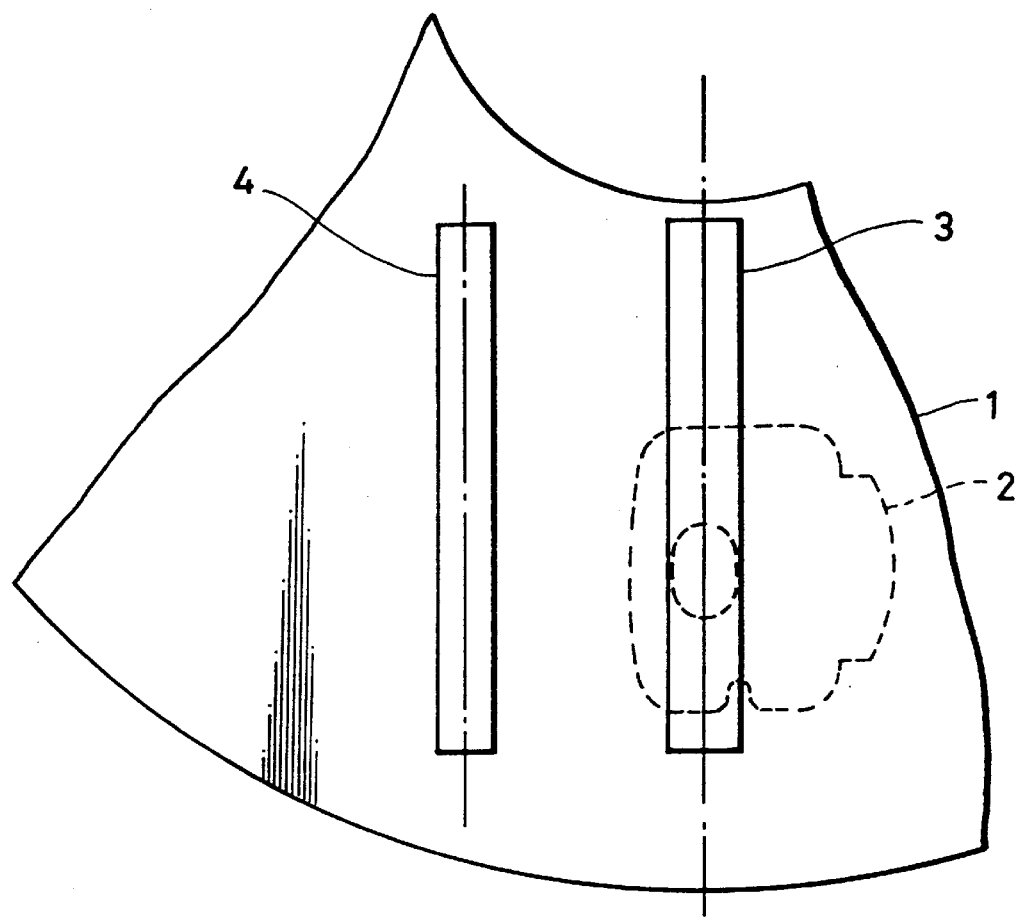
FIG. 1 is a plan view showing a main portion of a conventional magneto-optical disc apparatus.
Figure 2:
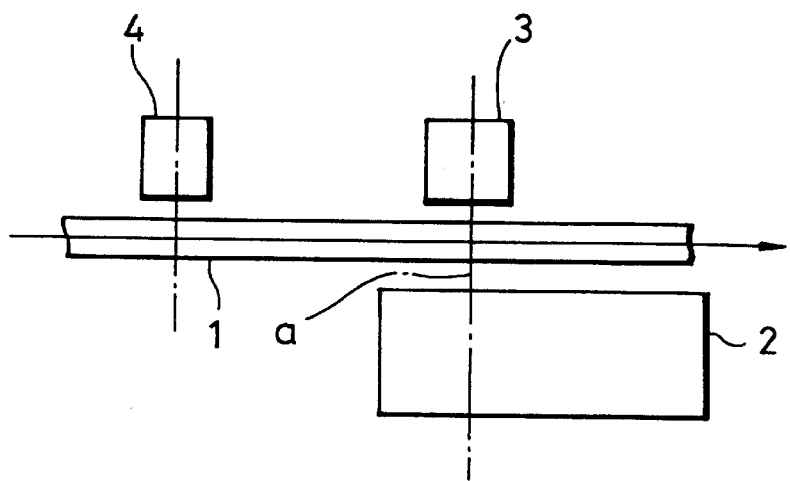
FIG. 2 is a side view thereof.
Figure 3:
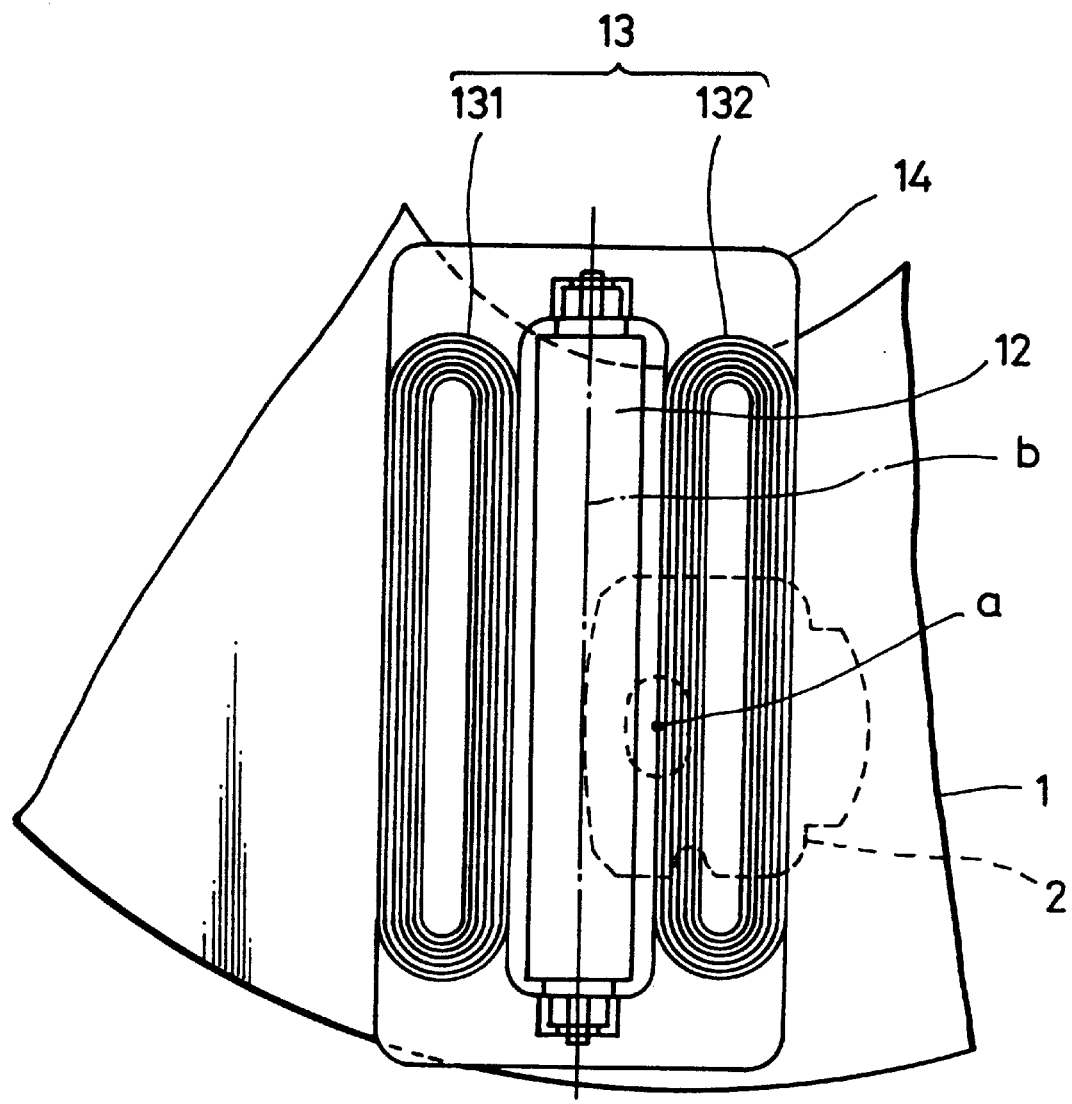
FIG. 3 is a plan view showing a main portion of a magneto-optical disc apparatus according to an embodiment of the present invention.
Figure 4:
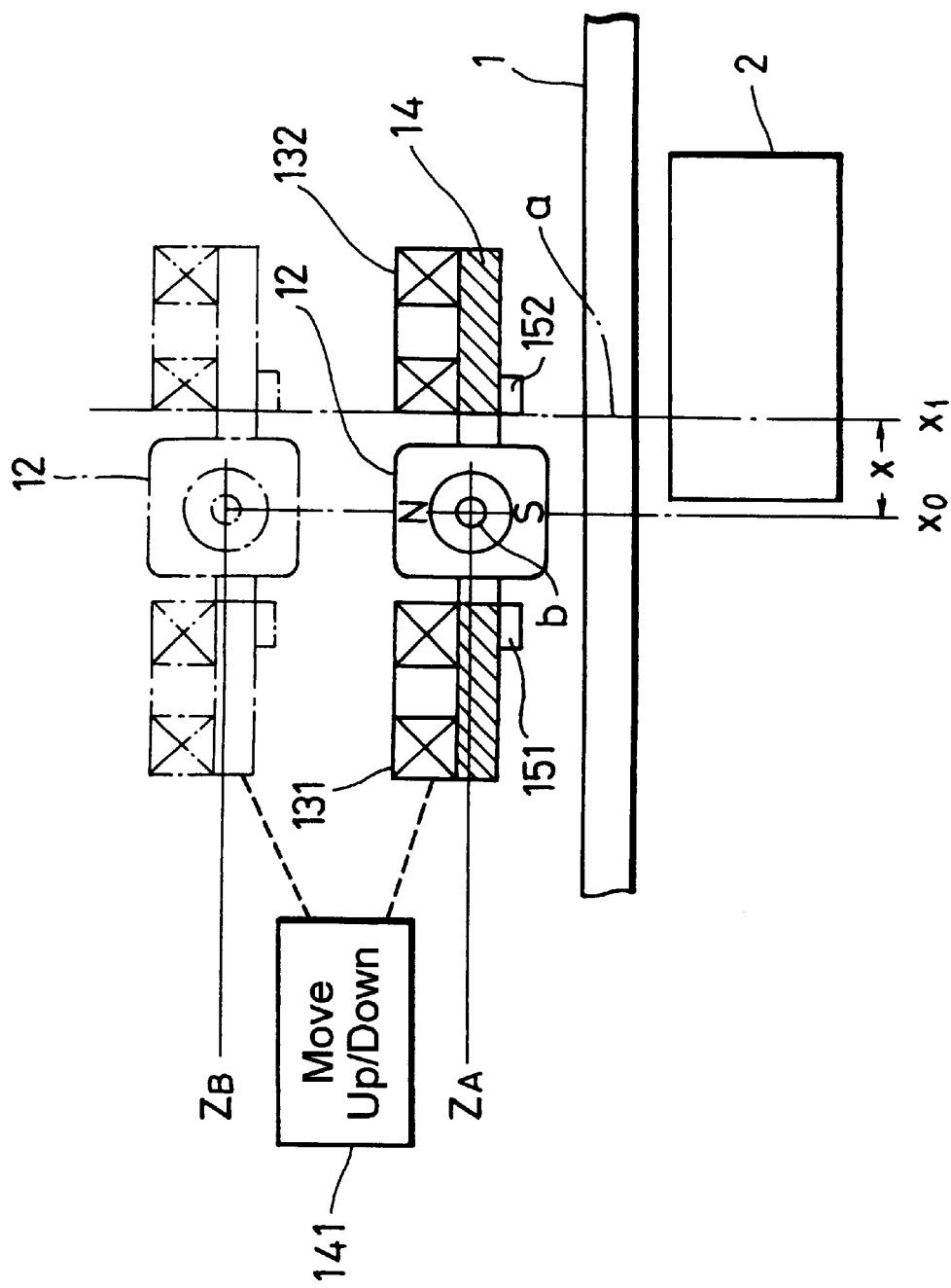
FIG. 4 is a side view showing the magneto-optical disc apparatus according to the embodiment of the present invention.

FIG. 3 is a plan view showing a main portion of the magneto-optical disc apparatus according to an embodiment of the present invention, and FIG. 4 is a side view thereof. As shown in FIGS. 3 and 4, a magnetic field generating source 12 that applies a magnetic field to the magneto-optical disc 1 is rotatably supported with respect to an axis b extended substantially along the surface of the magneto-optical disc 1 and a distance between the rotation central axis b and the magneto-optical disc 1 can be changed. According to the present invention, the magnetic field generating source 12 is formed of a permanent magnet. There is provided a drive coil 13 that rotates the magnetic field generating source 12. The magnetic field generating source 12 is rotated by a magnetic field generated from a drive coil 13 when the drive coil 13 is energized.

As described above, according to this embodiment, the magnetic field generating source 12 that applies a magnetic field to the magneto-optical disc 1 is supported rotatably to the magneto-optical disc 1. Also, the distance between the magnetic field generating source 12 and the magneto-optical disc 1 can be changed, whereby the polarity and the magnitude of the magnetic field applied to the magneto-optical disc 1 by the magnetic field generating source 12 or the like can be varied.

Further, since the magnetic field generating source 12 is disposed at the position deviated from the optical axis of the optical pickup 2, the magnitude of the vertical magnetic field relative to the magneto-optical disc 1 can be changed considerably on the light irradiation portion to the magneto-optical disc 1, i.e., on the optical axis a of the optical pickup 2 and beneath the magnetic field generating source 12.

Further, the magnetic field generating source 12 can move away from the surface of the magneto-optical disc 1, whereby a magnitude of a vertical magnetic field on the magneto-optical disc 1 can be made substantially uniform on the light irradiation portion on the magneto-optical disc 1 and beneath the magnetic field generating source 12.

Figure 5:
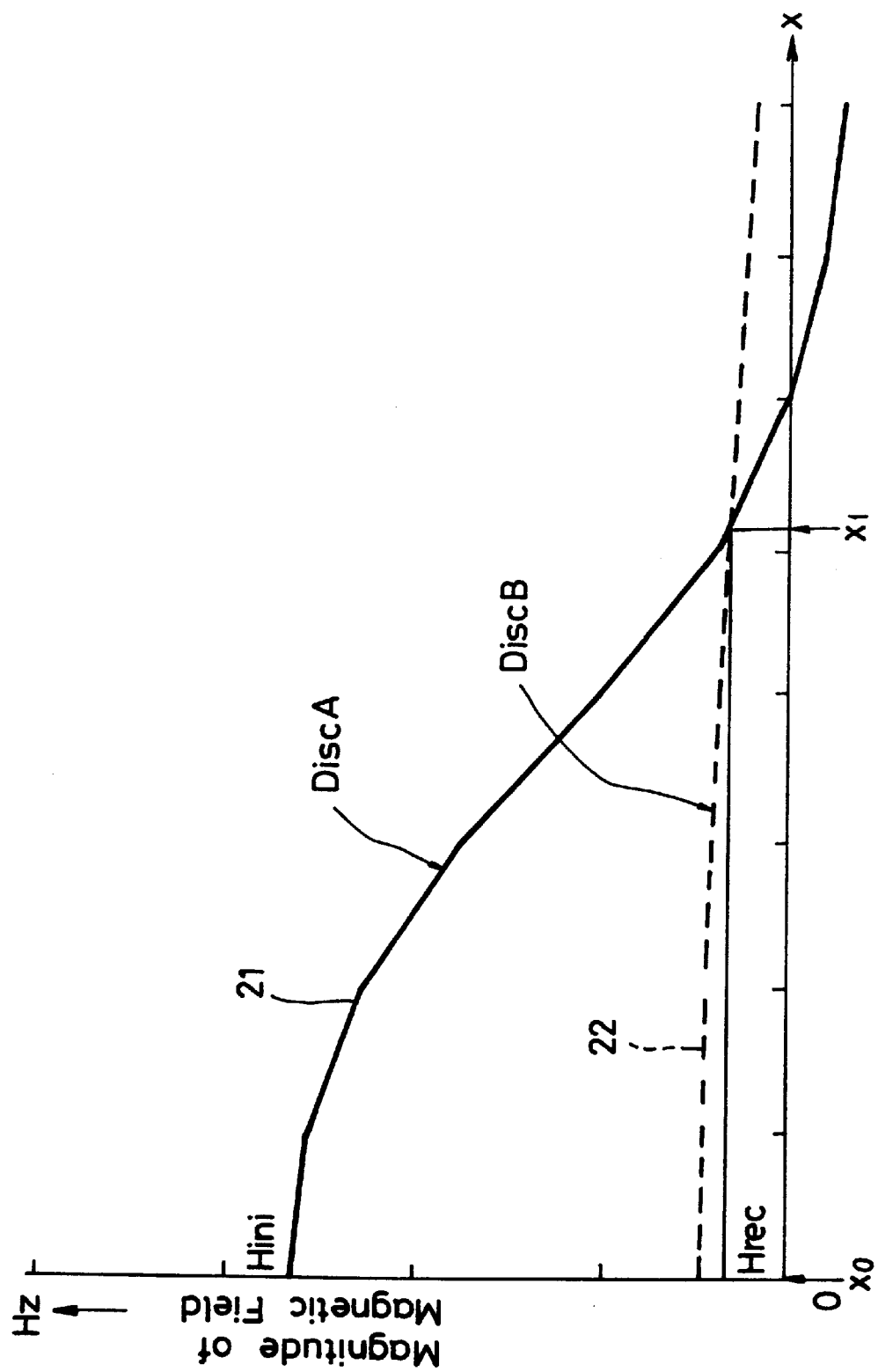
FIG. 5 is a characteristic graph showing measured results of distribution of magnitude of magnetic field of magneto-optical disc and a magnetic field in the vertical direction.

This will be described with reference to FIG. 5. FIG. 5 is a characteristic graph of magnetic field distribution in which an abscissa has an original point which is assumed to be a position $x_0$ just under which the rotation central axis b of the magnetic field generating source 12 exists and a distance x extended along the surface of the magneto-optical disc 1 and an ordinate has a magnitude Hz of a vertical magnetic field perpendicular to the magneto-optical disc 1. In FIG. 5, a solid curve 21 represents a distribution of a magnitude of a magnetic field generated when the rotation central axis b of the magnetic field generating source 12 is located near the optical disc, e.g., the position ZA in FIG. 4, and a dashed curve 22 represents a distribution of a magnitude of a magnetic field generated when the rotation central axis b of the magnetic field generating source 12 is located at the distant position ZB in FIG. 4. A position $x_1$ on the abscissa x represents a position at which the optical pickup 2 irradiates the magneto-optical disc 1.

Study of the curves 21 and 22 reveals that different vertical magnetic field distributions are presented when the position of the magnetic field generating source 12 relative to the magneto-optical disc 1 is selected to be the position ZA close to the magneto-optical disc 1 or the position ZB distant from the magneto-optical disc 1.

When the magnetic field generating source 12 is located near the magneto-optical disc 1, there can be obtained magnetic fields of different magnitudes just beneath the magnetic field generating source 12, i.e., the position $x_0$ and the position of the light irradiation portion $x_1$. Therefore, the magnetic field just under the magnetic field generating source 12 can be set to an initialization magnetic field Hini of several kilooersteds, and the magnetic field of the recording position made by the light irradiation portion can be set to a small recording magnetic field Hrec of about several 100s of oersteds.

On the other hand, when the position of the magnetic field generating source 12 relative to the magneto-optical disc 1 is brought to the distant position ZB, the magnetic distribution thereof can be substantially made uniform as shown by the curve 22 in FIG. 5. Therefore, not only the predetermined recording magnetic field Hrec, for example, can be applied to the light irradiation portion but also a large magnetic field, i.e., magnetic field of larger than 600 Oe can be prevented from being applied to other portions. That is, according to the structure of the present invention, the common magnetic field generating source 12 can apply recording and reproducing magnetic fields to plural kinds of discs A and B by utilizing the magnetic field magnitude distributions shown by the curves 21 and 22 under the optimum condition.

The magneto-optical disc apparatus according to the embodiment of the present invention will be described with reference to FIGS. 3 and 4 more fully.

As shown in FIGS. 3 a nd 4, the magneto-optical disc 1 is rotated in an ordinary fashion. The optical pickup 2 is moved in or along the radial direction of the magneto-optical disc 1 in an opposing relation to the magneto-optical disc 1. A light, e.g., laser beam of a predetermined intensity is irradiated on a predetermined track of the magneto-optical disc 1 via an axis perpendicular to the magneto-optical disc 1. Upon recording, the optical disc is heated on its light irradiation portion at a predetermined temperature, whereby a recording is effected, i.e., a recording pit (magnetic domain) is form ed under the predetermined recording magnetic field Hrec. Upon reproducing, the magneto-optical disc 1 is irradiated with a light of a predetermined low intensity, whereby a Kerr rotation angle produced in a reproduced light by a magneto-optical mutual action brought by the recording pits formed on the magneto-optical disc 1, i.e., Kerr effect is detected to read out an information from the magneto-optical disc 1.

In the above-mentioned structure, according to the present invention, a movable base plate 14 is disposed on the opposite side of the magneto-optical disc 1 opposing the optical pickup 2 so that the movable base plate 14 can be moved in the direction perpendicular to the surface of the magneto-optical disc 1. The movable base plate 14 includes the magnetic field generating source 12 pivoted thereto so as to become freely rotatable about the axis b.

The magnetic field generating source 12 is formed of a magnet of a prismatic configuration, for example, having a central axis coincident with the rotation central axis b and has N and S poles magnetized on its opposing sides. The movable base plate 14 is disposed on the plane parallel to the magneto-optical disc 1. The rotation central axis b of the magnetic field generating source 12 is disposed in parallel to the moving direction of the optical pickup 2, i.e., along the radial direction of the magneto-optical disc 1.

When the movable base plate 14 is moved, the rotation central axis b of the magnetic field generating source 12 is moved in parallel to the surface of the magneto-optical disc 1, whereby the magnetic field generating source 12 can be located at a first position ZA having a predetermined short distance relative to the magneto-optical disc 1 and a second position ZB having a long distance relative to the magneto-optical disc 1. The movable base plate 14 includes a drive coil 13 which comprises a pair of drive coils 131 and 132 disposed symmetrical with respect to the rotation central axis b of the magnetic field generating source 12. Further, the movable base plate 14 includes on its surface opposite to the surfaces on which the drive coils 131, 132 are disposed a pair of magnetic field detecting elements, e.g., Hall elements 151, 152 disposed symmetrical with respect to the rotation central axis b of the magnetic field generating source 12.

According to the above-mentioned structure, when the pair of drive coils 131, 132 are energized by a current of predetermined direction and magnitude, magnetic fields of predetermined directions are generated and cooperated with the magnetic field generated from the magnetic field generating source 12, whereby the magnetic field generating source 12 is rotated about the rotation central axis b in the clockwise or counter-clockwise direction.

As, for example, shown in FIG. 4, the magnetic field generating source 12 can be rotated such that the magnetized direction of N and S poles is disposed in the plane perpendicular to the magneto-optical disc 1 and that the S pole is opposed to the magneto-optical disc 1 or vice versa. Further, the magnetic field generating source 12 can be rotated such that the magnetized direction of N and S poles exists on the surface parallel to the magneto-optical disc 1. The moving position of the magnetic field generating source 12 can be set as follows. That is, magnetic fields applied to the pair of magnetic field detecting elements, e.g., Hall elements 151, 152 are detected by the Hall elements 151, 152 as electrical signals and then the drive coils 131, 132 are energized by corresponding currents under the control of the electrical signals, thereby the magnetic field generating source 12 being located at the predetermined rotation position.

In this embodiment, the disc A and the disc B are used. The disc A needs a large vertical magnetic field of 4 kilooersteds in which an initialization magnetic field Hini is about several kilooersteds. Upon recording and/or reproduction, under the condition that a recording magnetic field of about several 100s of oersteds is applied to the magneto-optical disc 1 on the axis a, an information is recorded in the form of "1" and "0" by changing the heating temperature of the light irradiation portion of the magneto-optical disc 1 by high and low powers based on a light intensity modulation upon recording. Then, the reproduction is carried out by a lower power.

The disc B is recorded and erased by heating the portion on the axis a with irradiation of light from the optical pickup 2 under the application of magnetic field of several 100s of oersteds, e.g., 400 Oe. Upon reproduction, the disc B is reproduced by the magneto-optical mutual action caused only by the irradiation of light, i.e., by detecting the Kerr rotation angle without applying the external vertical magnetic field substantially.

In the magneto-optical disc apparatus according to the present invention, predetermined magnetic fields are properly applied to the disc A and the disc B by the common magnetic field generating source 12 as follows.

Operation of the magneto-optical disc apparatus according to the present invention will hereinafter be described with reference to FIG. 6. Before the magneto-optical disc 1 is inserted into (loaded onto) the magneto-optical disc apparatus, the magnetic field generating source 12 on the movable base plate 14 is located at the position distant from the position at which the magneto-optical disc 1 is located, i.e., at the position ZB shown or the position distant from the position ZB shown in FIG. 4. Under this condition, the magneto-optical disc 1 is inserted into (loaded onto) the magneto-optical disc apparatus in process 41.

When the disc is inserted into the magneto-optical disc apparatus, the drive coils 131, 132 are energized by a current in process 42. In the next process 43, the magnetized direction of N and S poles of the magnetic field generating source, i.e., permanent magnet 12 is settled at the position of 90° in the position parallel to the magnetic disc 1. In this case, the magnetic field generating source 12 is located at the position distant from the magneto-optical disc 1. Also, the magnetized direction of N and S poles is extended in the direction parallel to the surface of the magneto-optical disc 1 so that the vertical magnetic field applied to the magneto-optical disc 1 is sufficiently small. Thus, the magnetic influence exerted upon the magneto-optical disc 1 can be avoided.

Then, it is determined in process 44 whether the disc inserted into the magneto-optical disc apparatus under this condition is the disc A or disc B. If the inserted disc is the disc A, then the process proceeds to the left-hand side process 45 in FIG. 6. Then, by energizing the drive coils 131 and 132, the magnetic field generating source 12 is rotated so that the magnetized direction thereof coincides with the direction perpendicular to the surface of the magneto-optical disc 1 (in process 46).

When the magnetic field is detected by the magnetic field detecting elements 151 and 152, the angle of the magnetic field generating source 12 is controlled and the magnetic field generating source 12 is set in the condition that the magnetized direction thereof is coincident with the direction perpendicular to the surface of the magneto-optical disc 1 (in process 47).

Thereafter, the movable base plate 14 is moved downwardly by unit 141 and set to the predetermined position ZA near the magneto-optical disc 1 (in process 48).

At that time, the initialization, the recording and the reproduction can be effected by causing the distribution (see the solid curve 21 in FIG. 5) of the vertical magnetic field component relative to the magneto-optical disc 1 to rapidly decrease at the point $x_0$ just beneath the rotation central axis b of the magnetic field generating source 12 in the direction in which the above distribution is being spaced apart from the point $x_0$ (in process 49).

That is, by properly selecting the magnitude of the magnetic field of the magnetic field generating source 12 and the distance relative to the light irradiation portion position $x_1$ of the optical pickup 2, etc., a magnetic field of a predetermined magnitude, e.g., initialization magnetic field Hini of several kilooersteds can be obtained beneath $x_1$ of the magnetic field generating source 12 and a predetermined recording magnetic field Hrec of, for example, several 100s of oersteds can be obtained at the portion irradiated with the light from the optical pickup 2.

Accordingly, under this condition (process) 49, if the optical pickup 2 is controlled in light intensity modulation so as to irradiate the magneto-optical disc 1 with low and high power in response to informations of "0" and "1", then the magneto-optical recording can be effected on the magneto-optical disc 1 by recording pits (magnetic domains) of "1" whose magnetic field is inverted under a high power. Whereas, if the optical pickup 2 irradiates the magneto-optical disc 1 with a light of a predetermined intensity lower than that of the recording mode, then the recording pits (magnetic domains) on the magneto-optical disc 1 can be read out by a magneto-optical mutual action.

If it is determined in the above process 44 that the disc is the disc B (in process 50), then when the recording or erasing is effected, the magnetic field generating source 12 is rotated 90° similarly to the case of the disc A by energizing the drive coils 131 and 132 similarly (in process 51) so that the magnetized direction of N and S poles becomes coincident with the direction perpendicular to the magneto-optical disc 1. Also, the angle of the magnetic field generating source 12 is accurately controlled by the magnetic field detecting elements 151, 152 (in process 52). Under this condition, i.e., under the condition that the magnetic field generating source 12 is located at the position ZB, the magnetic field distribution shown by the dashed curve 22 in FIG. 5 can be obtained and a predetermined recording or erasing can be effected by the light irradiated on the position $x_1$ from the optical pickup 2 (in process 53).

Upon playback, without energizing the drive coils 131 and 132, accordingly, under the condition that the magnetic field generating source 12 is held in the magnetized direction (in process 54), information recorded on the magneto-optical disc 1 can be read out (process 55) with the irradiation of light from the optical pickup 2 owing to the magneto-optical mutual action.

As described above, according to the structure of the present invention, since vertical magnetic fields of different magnitudes are applied to a plurality of portions of the magneto-optical disc 1 or a uniform vertical magnetic field of low intensity is applied to the magneto-optical disc 1 by the common magnetic field generating source 12, the recording, the reproduction or the like can be effected on the disc A and the disc B with a compatibility.

While the vertical magnetic field of the same direction is applied to the magneto-optical disc 1 as described above, the present invention is not limited thereto and may be applied to the case that the polarity of the magnetic field is inverted and then the initialization magnetic field or recording magnetic field is applied to the magneto-optical disc 1.

As described above, according to the present invention, since plural kinds of magnetic fields can be applied to the magneto-optical disc 1 by rotating and moving the common magnetic field generating source 12, the initialization magnetic field and the recording magnetic field can be applied not only to the ordinary magneto-optical disc (disc B) based on the ISO but also to the magneto-optical disc mentioned in the preamble or the magneto-optical disc (disc A) having ultra-high resolution. In this case, the disc B can be prevented from being applied with a strong magnetic field higher than, for example, 600 Oe regulated according to the ISO. Then, there can be avoided such disadvantage that the disc B is erased by the application of the above-mentioned strong magnetic field.

As set out above, according to the present invention, since the recording, the reproducing or the like operation can be reliably effected on plural kinds of the magneto-optical discs, the user can utilize the common magneto-optical disc apparatus, which can achieve a great benefit.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A magneto-optical disc apparatus for use with plural discs requiring different magnetic field intensities, comprising:

a magnetic field generating source for applying a plurality of discrete magnetic field intensities individual to one of said discs to a magneto-optical disc during reading or writing, said magnetic field generating source being made freely rotatable about an axis substantially parallel to and overlying a surface of said magneto-optical disc to allow rotating said source to change the direction of the field generated by said source relative to said disc; and means for changing a distance of said rotation central axis of said magnetic field generating source relative to said magneto-optical disc, to provide said plurality of magnetic field intensities at said disc.

2. A magneto-optical disc apparatus according to claim 1, in which said magnetic field generating source is disposed with a displacement from an optical axis of an optical pickup relative to said magneto-optical disc.

3. A magneto-optical disc apparatus according to claim 1 or 2, in which said magnetic field generating source is formed of a permanent magnet and said magnetic field generating source includes drive coils so that said magnetic field generating source is rotated by magnetic fields generated from said drive coils when said drive coils are energized.

* * * * *